US008430168B2

(12) United States Patent
Goodall et al.

(10) Patent No.: US 8,430,168 B2
(45) Date of Patent: Apr. 30, 2013

(54) APPARATUS AND METHODS FOR SUBSEA CONTROL SYSTEM TESTING

(75) Inventors: Alastair R. Goodall, Bonnyrigg (GB); Alan J Sweeney, Houston, TX (US)

(73) Assignee: Valkyrie Commissioning Services, Inc., Houston, TX (US)

( * ) Notice: Subject to any disclaimer, the term of this patent is extended or adjusted under 35 U.S.C. 154(b) by 542 days.

(21) Appl. No.: 12/468,158

(22) Filed: May 19, 2009

(65) Prior Publication Data
US 2009/0288836 A1 Nov. 26, 2009

Related U.S. Application Data

(60) Provisional application No. 61/054,873, filed on May 21, 2008.

(51) Int. Cl.
*E21B 7/12* (2006.01)

(52) U.S. Cl.
USPC ............ 166/336; 166/337; 166/344; 166/345

(58) Field of Classification Search .................. 166/336, 166/337, 344, 345, 368, 357, 250.01, 254.2
See application file for complete search history.

(56) References Cited

U.S. PATENT DOCUMENTS

| 3,469,627 | A | * | 9/1969 | Baker | 166/356 |
|---|---|---|---|---|---|
| 4,010,619 | A | * | 3/1977 | Hightower et al. | 405/191 |
| 4,376,467 | A | * | 3/1983 | Allen | 175/7 |
| 4,444,218 | A | * | 4/1984 | Baugh | 137/236.1 |
| 4,457,378 | A | * | 7/1984 | Watkins | 166/347 |
| 4,601,608 | A | * | 7/1986 | Ahlstone | 405/169 |
| 4,625,805 | A | * | 12/1986 | Ladecky | 166/341 |
| 4,682,913 | A | * | 7/1987 | Shatto et al. | 405/169 |
| 4,732,215 | A | * | 3/1988 | Hopper | 166/366 |
| 4,832,124 | A | * | 5/1989 | Rayson | 166/339 |
| 4,848,472 | A | * | 7/1989 | Hopper | 166/344 |
| 4,860,581 | A | * | 8/1989 | Zimmerman et al. | 73/152.26 |
| 4,878,783 | A | * | 11/1989 | Baugh | 405/169 |
| 5,025,865 | A | * | 6/1991 | Caldwell et al. | 166/366 |
| 5,083,452 | A | * | 1/1992 | Hope | 73/61.49 |

(Continued)

FOREIGN PATENT DOCUMENTS

| GB | 2323907 A | 7/1998 |
|---|---|---|
| WO | 03002403 A1 | 1/2003 |
| WO | 03056132 A1 | 7/2003 |
| WO | 2008100943 A2 | 8/2008 |

OTHER PUBLICATIONS

Kobe Hydraulic Triplex Pumps, May 25, 2007.*

(Continued)

*Primary Examiner* — Thomas Beach
*Assistant Examiner* — Aaron Lembo
(74) *Attorney, Agent, or Firm* — Wong Cabello Lutsch Rutherford & Brucculeri LLP

(57) ABSTRACT

Apparatus and methods are described for subsea control system testing including one or more of electrical, optical and fluidic conduit testing, wherein the testing is conducted subsea using a subsea testing skid. In one embodiment of the invention a subsea pipeline service skid is provided that includes at least one skid mounted pump dimensioned to deliver from about 3000 to about 20000 p.s.i. of pressure for pressure testing the fluidic conduits to desired pressures. Modular construction of the skid permits customization for testing service of unique subsea control equipment.

21 Claims, 6 Drawing Sheets

U.S. PATENT DOCUMENTS

| | | | |
|---|---|---|---|
| 5,114,117 A * | 5/1992 | Appleford et al. | 251/149.9 |
| 5,192,167 A * | 3/1993 | da Silva et al. | 405/195.1 |
| 5,593,249 A * | 1/1997 | Cox et al. | 405/191 |
| H1676 H * | 9/1997 | Marshall | 340/605 |
| 6,223,675 B1 * | 5/2001 | Watt et al. | 114/312 |
| 6,234,717 B1 * | 5/2001 | Corbetta | 405/170 |
| 6,446,720 B1 * | 9/2002 | Ringgenberg et al. | 166/250.17 |
| 6,488,093 B2 * | 12/2002 | Moss | 166/339 |
| 6,599,430 B2 * | 7/2003 | Vickio, Jr. | 210/739 |
| 6,644,410 B1 | 11/2003 | Lindsey-Curran et al. | |
| 6,672,389 B1 * | 1/2004 | Hinrichs | 166/317 |
| 6,832,874 B2 * | 12/2004 | Appleford et al. | 405/189 |
| 6,840,088 B2 * | 1/2005 | Tucker et al. | 73/49.5 |
| 6,957,577 B1 * | 10/2005 | Firmin | 73/152.51 |
| 7,021,375 B2 * | 4/2006 | Ringgenberg et al. | 166/250.17 |
| 7,086,467 B2 * | 8/2006 | Schlegelmilch et al. | 166/298 |
| 7,152,682 B2 * | 12/2006 | Hopper | 166/357 |
| 7,487,836 B2 * | 2/2009 | Boyce et al. | 166/340 |
| 7,516,795 B2 * | 4/2009 | Lopes Euphemio et al. | 166/357 |
| 7,549,471 B2 * | 6/2009 | Aivalis et al. | 166/254.2 |
| 7,578,349 B2 * | 8/2009 | Sundararajan et al. | 166/363 |
| 7,654,321 B2 * | 2/2010 | Zazovsky et al. | 166/264 |
| 7,730,966 B2 * | 6/2010 | Fragachan | 175/24 |
| 7,967,066 B2 * | 6/2011 | McStay et al. | 166/250.01 |
| 2003/0010094 A1 * | 1/2003 | Tucker et al. | 73/49.5 |
| 2003/0079881 A1 * | 5/2003 | Moss | 166/339 |
| 2003/0178200 A1 * | 9/2003 | Fox et al. | 166/341 |
| 2003/0180096 A1 * | 9/2003 | Appleford et al. | 405/190 |
| 2004/0207198 A1 * | 10/2004 | Aguilera et al. | 285/125.1 |
| 2004/0244983 A1 * | 12/2004 | Appleford et al. | 166/357 |
| 2004/0251030 A1 * | 12/2004 | Appleford et al. | 166/357 |
| 2005/0155814 A1 * | 7/2005 | Bath et al. | 181/112 |
| 2006/0118310 A1 * | 6/2006 | Euphemio et al. | 166/368 |
| 2006/0124314 A1 * | 6/2006 | Haheim et al. | 166/368 |
| 2006/0151175 A1 * | 7/2006 | Sundararajan et al. | 166/338 |
| 2007/0199715 A1 * | 8/2007 | Ayoub et al. | 166/336 |
| 2008/0093081 A1 * | 4/2008 | Stoisits et al. | 166/366 |
| 2009/0178848 A1 * | 7/2009 | Nellessen et al. | 175/7 |
| 2009/0284068 A1 * | 11/2009 | Yu et al. | 299/1.9 |
| 2010/0012326 A1 * | 1/2010 | Sundararajan et al. | 166/345 |
| 2010/0059221 A1 * | 3/2010 | Vannuffelen et al. | 166/264 |
| 2010/0085064 A1 * | 4/2010 | Loeb et al. | 324/537 |
| 2010/0089126 A1 * | 4/2010 | Sweeney | 73/40 |
| 2010/0089584 A1 * | 4/2010 | Burns | 166/302 |
| 2010/0101799 A1 * | 4/2010 | Spencer et al. | 166/339 |

OTHER PUBLICATIONS

International Search Report from UK patent application GB0908692.7 dated Jul. 14, 2009.
Imes Group Presentation, "Integrity of subsea Control Systems; Electrical testing in deepwater environments" Tony Cummings, 2005.

* cited by examiner

APPARATUS AND METHODS FOR SUBSEA CONTROL SYSTEM TESTING

CROSS REFERENCE TO RELATED APPLICATIONS

This application claims priority based on U.S. Provisional Application Ser. No. 61/054,873 filed May 21, 2008, the contents of which are incorporated herein by reference.

TECHNICAL FIELD

This invention relates apparatus and methods for service of subsea control systems including electrical cables, optical fibers and fluid conduits.

BACKGROUND

Without limiting the scope of the invention, its background is described in connection with novel apparatus and methods for service of subsea control systems.

It is currently estimated that approximately 60% of the world's petroleum production derives from offshore operations. To meet demands, and in an environment of increased values for oil and gas, exploration and subsequent production is being undertaken in deeper and deeper waters. For example, oil and gas is now being produced off the Louisiana coast in 9,000 feet of water. These offshore efforts have required expensive specialized solutions including construction of sophisticated subsea production structures for collection and transport of oil and gas from well heads to gathering structures, hub facilities and to onshore processing refineries.

Subsea exploration and production equipment are typically operated remotely via a plurality of control conduits that convey control signals as well as operating and control fluids. The construction of subsea exploration and production equipment is time consuming and immensely expensive. Typically the functional components of subsea control systems, including subsea umbilicals, flying leads, and the subsea control modules that control production trees, completion and test trees, blowout preventers, manifolds and distribution units, are tested on the surface, or "topsides", prior to overboarding from the construction vessel. However, the functional components of a subsea control system can be left in position for a matter of months before being connected to the other parts of the subsea control system. It is at this time that the control systems are again integrity tested, again by connection to topside testing equipment. If the control system is not up to specification when finally ready to be connected, significant and highly expensive delays are occasioned. Assessment of how the subsea control system equipment such as umbilicals react to subsea environmental and operating conditions has heretofore only been possible through hyperbaric chamber testing, modeling and theoretical predictions of the integrity of the umbilical under the conditions in which it was deployed and will be utilized. Actual subsea testing of the status and integrity of subsea control systems such as umbilicals and subsea control modules has not heretofore been available.

Furthermore, the stresses placed on subsea control systems, particularly production umbilicals, can be immense and can include permeation by seawater contaminants; extreme pressure; extreme cold; wave, seismic and mechanical movements; vibration and impact effects; chemical incompatibility with fluids and gasses; and electrical (galvanic) and chemical corrosion.

What are needed are subsea apparatus and methods able to determine the functional status and integrity of subsea control systems after initial placement as well as prior to hook-up and once they have been on position or in operation on the seabed for some period of time.

SUMMARY

The present invention is directed to a methods and apparatus for subsea testing of subsea oil and gas drilling and production control systems including subsea umbilicals, flying leads, and the subsea control modules that control production trees, completion and test trees, blowout preventers, manifolds and distribution units. In one embodiment of the invention, a subsea testing skid is provided that includes testing equipment for each of the components of a given subsea control system.

For example, for electrical integrity testing, the skid includes an electrical testing module that includes capacity to test for one or more of conductor resistance, insulation resistance, time domain reflectometry (TDR), high voltage capacity & continuity of electrical cables. The electronics required to perform the testing are housed within or connected to a datalogger. In one embodiment a ROV, SV or AUV is used to power the electrical testing module and data logger and to relay the data to the surface. In one embodiment the electrical testing module is customized to dock with the particular electrical fittings on a given unique individual subsea control system. In one aspect the control system is an umbilical termination assembly. In another aspect the control system is a subsea control module that operates a production tree, completion and test tree, blowout preventer, manifold or distribution unit.

For testing of optical fibers if included in the subsea control system, an optical fiber testing module is included. In one embodiment the optical testing module includes capacity for optical time domain reflectrometry (OTDR). In one embodiment the optical testing module is customized to dock with the particular optical end fittings on a given unique individual subsea control system.

For testing of hoses and tubes included in an umbilical, flying lead, subsea control systems, production trees, completion and test trees, blowout preventors, manifold or distribution units, a fluidic testing module is included having capacity to test one or more of proof pressure/decay, pressure integrity, and flow and fluid cleanliness on fluid conduits including hydraulic lines. In one embodiment the fluidic testing module is customized to dock with the particular fluid conduit end fittings on a given unique individual subsea control system terminal, such as for example an umbilical termination assembly, flying lead terminal or subsea control modules and jumpers therefore. The testing methods and apparatus disclosed herein are applicable to both dynamic and static umbilicals and modules are provided for testing of one or more of electrical cables, optical fibers and fluidic conduits disposed within the umbilicals.

In one embodiment of the invention, the fluid testing module further comprises a chemical sampling module adapted to introduce a sample solution into the fluidic conduit to be tested and to subsequently collect the sample solution into a sample collection bladder for subsequent topside testing. During testing, the sample solution is allowed to contact the interior of the fluidic conduit, typically a tube or hose, for sufficient time that subsequent testing of the sample solution is indicative of the integrity of the lining of the fluidic conduit. Topside and subsea evaluation of the sample solution can be undertaken to evaluate the chemical and thus structural integrity of the fluidic conduit. In one embodiment particle counting is conducted subsea in order to assess the cleanliness of the fluidic conduit.

In some embodiments, the skid further includes at least one chemical treatment bladder for dosing subsea control system tubing and/or hoses with chemicals after removal of the sample. The skid may further include a chemical dosing pump.

In some circumstances, a component of a subsea control system under construction, such as for example a subsea umbilical, is filled with storage fluids that must be removed before being connected to other parts of the subsea system. Thus, in one embodiment, the testing skid is adapted to displace these storage fluids with desired control fluids. The control fluids are carried to the subsea location in a control fluid supply bladder. The storage fluids are collected into a waste fluid containment bladder for recovery to the surface.

In one embodiment of the invention a subsea pipeline service skid is provided that includes at least one skid mounted high pressure positive displacement pump operable to deliver from about 3000 to about 20000 p.s.i. of pressure for pressure testing the fluidic conduits to desired pressures. In one embodiment, the skid includes at least one hand pump operable by the SV, ROV or AUV to equalize the pressure between the skid mounted pump and subsea control system tubing and/or hoses prior to initiating fluid communication between the pump and the control system.

Because a given exploration and production project will often have individualized engineering design characteristics and feature its own unique equipment, the modular format of the umbilical testing skid permits servicing of diverse unique subsea control systems depending on their particular conformation and bundled components.

In another embodiment, a method of subsea control system testing is provided including the steps of providing a subsea testing skid that comprises one or more of an electrical testing module, optical testing module and a fluidic testing module; utilizing a SV, AUV or ROV to move the testing skid to the subsea control system termination assembly; docking the testing skid with the termination assembly; and testing the integrity of one or more of electrical, optical and or fluidic conduits bundled in or associated with the control system.

DETAILED DESCRIPTION

Figure 1:
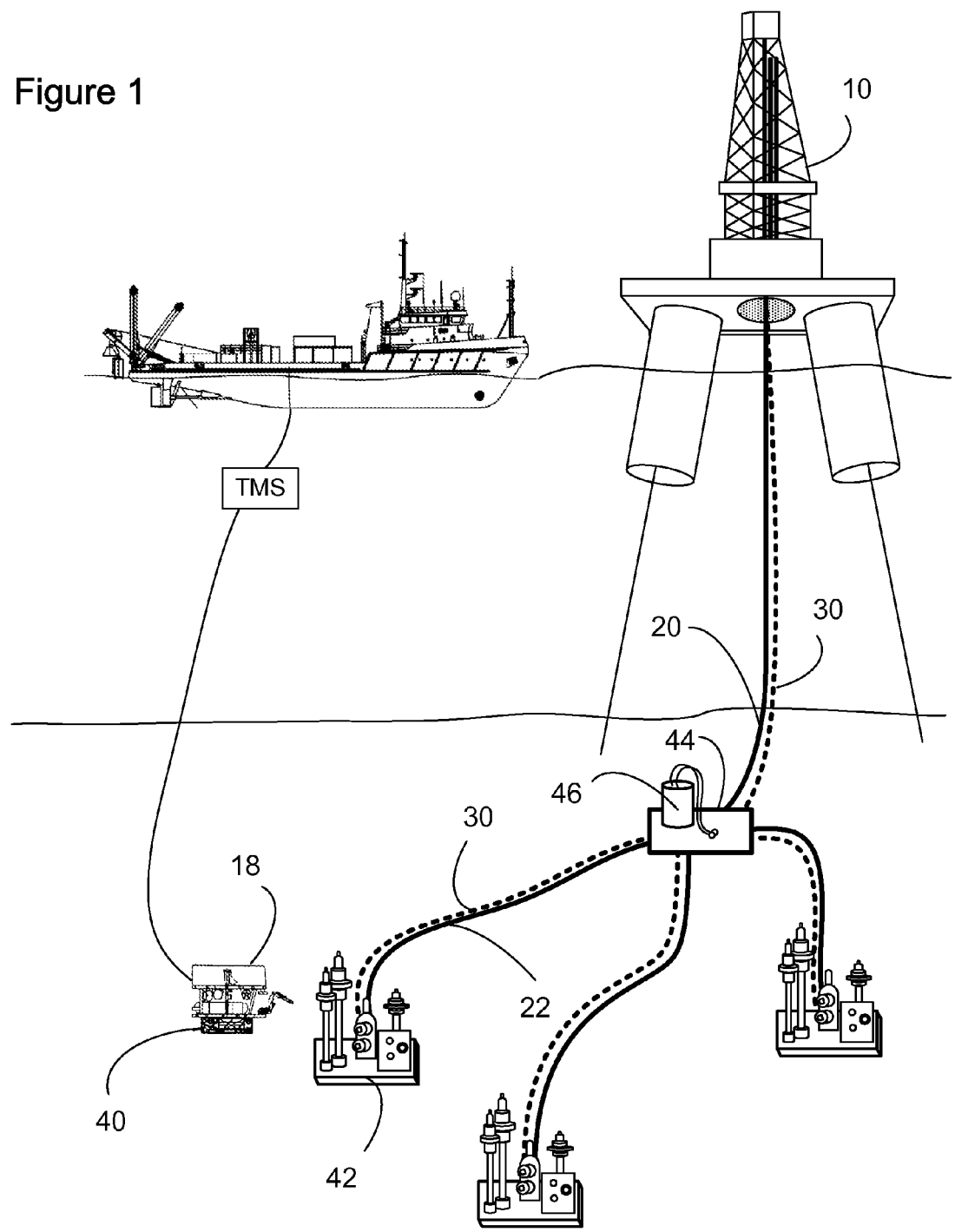
FIG. 1 depicts a subsea production facility and delivery of a testing skid to perform subsea testing.

While the making and using of various embodiments of the present invention are discussed in detail below, it should be appreciated that the present invention provides many applicable inventive concepts which can be employed in a wide variety of specific contexts. The specific embodiments discussed herein are merely illustrative of specific ways to make and use the invention and do not delimit the scope of the invention.

To facilitate the understanding of this invention, a number of terms and, in some cases, related abbreviations, are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The American Petroleum Institute (API) and the International Organization for Standardization (ISO) have together produced global standards for design, material selection, manufacture, design verification, testing, installation and operation of subsea production systems. The skid provided herein is designed to provide testing as required by the API/ISO standards. Among those standards directed principally to subsea production, RP 17A/ISO 13628-1 provides general requirements and recommendations for the design and operation of subsea production systems. RP 17B/ISO 13628-11 is directed to flexible pipe systems for subsea and marine riser applications. RP 17C/ISO 13628-3 is directed to Through Flow Line (TFL) systems. API Spec 17D relates to subsea well head and Christmas tree equipment.

API Spec 17E/ISO 13628-5 (API, 2003) provides the specification for subsea control umbilicals including subsea control systems, chemical injection, gas lift, utility and service umbilicals and associated ancillary equipment for the petroleum and natural gas industries. 17E applies to umbilicals containing electrical conductors, optical fibres, thermoplastic hoses and metallic tubes, either alone or in combination. It also applies to umbilicals that are for static or dynamic service, and with routings of surface-surface, surface-subsea and subsea-subsea. API Spec 17F/ISO 13628-6 provides specifications for subsea production control systems including control fluids design, testing, installation and operation. RP 17G/ISO 13628-7 controls workover and completion riser systems including among other things workover control systems, lower workover riser packages, and subsea test trees. The specifications can be quite specific, such as for example, Spec 17J/ISO 13628-2, which is the specification for unbonded flexible pipe including both static and dynamic flexible pipes used as flowlines, risers and jumpers, while Spec 17K/ISO 13628-10 is the corresponding specification for bonded flexible pipe.

The following further acronyms are used herein.

| Abbreviation | Meaning |
| --- | --- |
| API | American Petroleum Institute |
| ASTM | American Society for Testing and Materials |
| AUV | Autonomous Underwater Vehicle (untethered) |
| CR | Conductor Resistance |
| FAT | Factory Acceptance Testing or Post-Fabrication Testing |
| FPSO | Floating Production, Storage and Offloading |
| IR | Insulator Resistance |
| ISO | International Organization for Standardization |
| OTDR | Optical Time Domain Reflectometry |
| ROV | Remote Operated Vehicle (tethered and operated from the surface) |
| SIT | System Integration Testing |

-continued

| Abbreviation | Meaning |
|---|---|
| STU | Steel Tube Umbilical |
| SUTA | Subsea Umbilical Termination Assembly |
| SV | Submersible Vehicle that is operated by human operators in the SV |
| TDR | Time Domain Reflectometry |

For purposes of the present invention, subsea control systems include but are not limited to dynamic umbilicals, static umbilicals, flying leads, subsea control modules, production valve networks (also known as Christmas trees), test and intervention trees, manifolds & distribution units. These systems manage production from well heads several thousand feet below the ocean's surface. Most subsea valve networks are hydraulically controlled while subsea control modules are often filled with control or hydraulic fluid to keep their housings from collapsing under the extreme hydrostatic pressure.

A subsea umbilical includes one or more control conduits disposed within a water tight sheath. The umbilicals may connect subsea structures as well as communicate between subsea structures and surface control and operating structures. Subsea umbilicals may contain one or more electrical conductors, optical fibers, and thermoplastic hoses and metallic tubes of various dimensions and pressure ratings, either singularly or bundled in combination. Umbilicals provide electric and hydraulic power from host platforms to subsea production centers and transmit electronic data to and from the host platforms. Umbilicals also transport well service fluids, gas lift fluids and oil recovery gases to the production centers. Subsea umbilicals are typically complex assemblies and are designed for a particular production system or field. For example, a control umbilical system typically includes fluidic conduits for high and low pressure fluid supplies, chemical injection fluids, and annulus fluids as well as the electrical power and/or signal conduits. Umbilicals including service lines are adapted to transfer chemical fluids that are temporarily exposed to well fluid at maximum wellhead temperature.

The umbilical can be static, meaning subject to limited movement, such as for example umbilicals tied to pipelines or connecting fixed subsea structures to fixed platforms. Alternatively the umbilical can be dynamic, meaning subject to motion such as for example an umbilical connecting a subsea structure to a floating vessel. The umbilical is terminated on each end with a subsea umbilical termination assembly (SUTA).

During the lay process, subsea umbilicals are tested from topsides until the point of overboarding. They are not tested again until they are hooked up to the other parts of the subsea control system. This testing is also done from topsides. Although subsea umbilicals are designed to survive installation loads, including load-out, handling on installation vessel, lay tension, pull-in and connection, as well as trenching and rockdumping, heretofore it has not been possible to test the functional condition of the umbilical in position on the sea floor. Subsea testing of the fluidic conduit integrity of subsea control systems including umbilicals has not been hereto fore available and constitutes an unmet need in the industry.

The present invention provides a subsea testing skid adapted for subsea testing of subsea control systems including and not limited to dynamic umbilicals, static umbilicals, flying leads, and the subsea control modules that control valve networks, manifolds and distribution units. The testing apparatus and methods provided herein are applicable to installation and pre-commissioning phases as well as to on-going testing as the subsea equipment ages. The subsea testing apparatus and method provided herein enable in-place assessment of fatigue stress in the structural components of subsea control systems and particularly in subsea umbilicals. Umbilicals are often subject to curving and bending, which affect the maximum pressure that they can withstand without potential failure. As the umbilicals age, the effects of extremes of temperature and pressure as well as external and internal corrosion affect the mechanical properties of the fluidic conduits within the umbilical as well as insulation surrounding other included components of the umbilical. By testing subsea, actual measurements and status can be obtained in lieu of the potentially damaging topsiding of the umbilical for testing or relying on modelled predictions of umbilical status.

The following examples are included for the sake of completeness of disclosure and to illustrate the methods of making the compositions and composites of the present invention as well as to present certain characteristics of the compositions. In no way are these examples intended to limit the scope or teaching of this disclosure.

Example 1

In one embodiment, a subsea control system testing skid (40) is adapted for static umbilical testing and is customized to the individual constituents and design parameters of the umbilical to be tested. The umbilicals transport electric power, control signals, and hydraulic fluid between subsea structures as well as from a platform or FPSO vessel. FIG. 1 depicts a platform (10) having a production riser (20) and a static umbilical (30) leading to a manifold (44) and operably connected to the subsea control modules (46) that operate the manifold. Production trees (42) of satellite wells are connected to manifold (44) by flowlines (22) and further umbilicals (30) that form operable connections between subsea control modules on the production trees and the subsea control modules (46) that operate the manifold. The static umbilicals (30) are tested in their final position on the seabed (whilst waiting to be connected to the other parts of the subsea control system) by utilizing a testing skid (40) mounted to and powered by a ROV, SV or AUV (18). ROV, SVs or AUVs are typically used to position static umbilicals on the seabed and are here adapted to fly the testing skid (40) to a subsea umbilical termination assembly (SUTA) on umbilical (30) that has been laid in position to terminate in production tree (42).

In one aspect, the testing skid includes at least one fluidic conduit testing module that ensures that the integrity of hoses and tubes within umbilicals has been maintained during laying as well as after being subject to subsea conditions. Testing may include one or more of electrical testing, optical testing, elemental analysis, and pressure testing. In one embodiment of the invention, the electrical testing module conducts electrical testing to ensure that the umbilical remains within its FAT requirements including by testing to specification of one or more of insulation resistance (IR), CR (conductor resistance), and HV DC tests, attenuation, capacitance, signal propagation delay time, impedance, cross talk attenuation testing and TDR testing. Optical testing of the fiber optics of the umbilical are tested to ensure specifications within FAT requirements including determinations of signal attenuation, including splice and mated-connector losses and to ensure the integrity of the sheathing. In one embodiment, the optical testing includes optical time domain reflectometry (OTDR), which can be also be used to locate faults including breaks, and to measure optical return loss from intervening devices in the path of the optical fiber. Hydraulic, optical and electrical testing modules and components thereof are marinized, meaning made watertight and adapted for use in water at extreme temperatures and pressures.

In one embodiment of the invention, testing skid utilizes the hydraulic power of an ROV, SV or AUV to carry out testing the static umbilical before connection to the remaining parts of the subsea control system. The solution provided herein enables subsea testing of the static umbilical thus confirming that the integrity of the static umbilical has been maintained after lay is complete. In one embodiment, the hoses/tubes within the umbilical are pressure tested to 1.1× DWP (design working pressure) to ensure the physical integrity of the hoses/tubes including absence of leaks and structural defects, such testing performed using a high pressure pump and filtration. A fluidic or hydraulic testing circuit with filtration is provided for proof pressure/decay, which determines pressure, temperature and flow. The fluidic or hydraulic testing module is electrically connected to a data logger that can store the testing data as well as convey the data real-time via the ROV, SUV or AUV. In one embodiment the hydraulic testing module includes a marinized particle analyzer for assessing cleanliness of the hydraulic fluid.

In one embodiment the testing skid carries a fluid testing bladder that carries sufficient fluid for pressure testing purposes, typically the fluid will be either a storage fluid that the umbilical was laid with or a hydraulic power fluid that the umbilical is in service with. A given umbilical may include a plurality of different hydraulic lines, which may be of different internal diameter and thus have different volumes. Depending on what equipment is being powered, the different hydraulic lines may include different power fluids and may be adapted to operate at different hydraulic pressures. Various different hydraulic lines on the umbilical could have specific test parameters, including pressure, temperature, volume and chemical integrity. In certain aspects the testing skid is set up to test one particular hydraulic line of the umbilical and the skid is configured top-sides to set the pressure release valve specific to the required test pressure and a flying lead connection is installed to match the hydraulic line to be tested in the umbilical. In other embodiments, the skid is adapted to test more than one hydraulic line and is fitted with further test fluid bladders and flying leads. In either event, a data logger is mounted on the testing skid and connected to the hydraulic system will record the test results, including pressure, temperature and volume.

Because the hydraulic fluid line is already filled and because fluid is essentially non compressible, the additional volume to be supplied for pressure testing purposes is relatively small even for a large volume hydraulic line. However, because fluid is non-compressible, the pump that is dimensioned to supply test pressure is a high pressure positive displacement pump that is operable to deliver from 3000 to 20,000 psi.

In one embodiment, a plurality of fluidic circuits is provided in order to pressurise/flush different hoses and tubes with different fluids. In one embodiment, the high pressure positive displacement pump is a triplex type pump that is operable to deliver test pressures up to 20,000 psi.

Hydraulic lines disposed in the umbilical can also be flushed to achieve cleanliness levels, for example to national aerospace standards. In one embodiment the flow cleanliness service includes a flushing or testing loop circuit established on the hydraulic line in the umbilical. Flow is cycled through the hydraulic strings to be tested. Typically for topsides testing, which was the only method heretofore available, the volume pushed through the hydraulic line for flushing is three times the volume of the strings under test. On topsides it is typical to draw a sample after each volume for analysis or take readings from a particle analyser. The cleanliness level to be achieved can differ depending on the fluid being analysed but is normally done to aerospace standards (NAS6 or NAS8). As provided herein the flow cleanliness service that has heretofore been conducted topsides is provided subsea. Thus, a testing skid including a high pressure positive displacement pump operable to deliver from 3000 to 20,000 psi and a test fluid supply bladder is deployed subsea and connected subsea to a fluidic conduit of a subsea umbilical though the respective port of the umbilical termination assembly. A prescribed volume of test fluid is cycled through the umbilical. In one embodiment, samples are collected and stored for topside testing. In other embodiments, a particle analyser is marinized, mounted on the skid and connected as part of the fluid testing module. The skid mounted analyser will display the cleanliness level achieved. The data can be viewed by the ROV camera and/or collected electronically via the data logger. In one aspect the data is relayed real time to the surface via the ROV. The flow meter on the skid displays the volume that has passed through the umbilical and indicates the analysis time points.

A flow rate sufficient to achieve turbulent flow is provided by the skid mounted high pressure positive displacement pump. Turbulent flow is required to determine flow cleanliness because the turbulence removes particles that may have accumulated during low flow conditions during lay or during service. In some settings, turbulent flow characterized by a desired Reynolds (Re) number is required, in particular to avoid non-turbulent laminar flow conditions. The Reynolds number is determined mathematically by considering the density and viscosity of the fluid in the conduit together with the velocity of fluid flow and the dimensions of the conduit. In some settings, a Reynolds number of >4000 is specified to ensure turbulent flow. The high pressure pump, together with associated fittings, is designed to be capable of attaining a Reynolds number of >4000 with a cleaning fluid compatible with the fluid the umbilical conduit is designed to hold. In certain applications, depending on the size of the strings under test, the fluid end of the high pressure pump is modified to deliver a flow rate sufficiently high to achieve the required Reynolds number.

In one aspect, the fluidic or testing circuit is adapted for flushing of hydraulic lines in conjunction with a waste containment bladder for collection of the hydraulic as well as a power fluid supply bladder for filling the hydraulic lines with the desired fluid. Depending on the dimensions of the hydraulic line to be emptied and refilled with power fluid, the containment bladder and the supply bladder may be disposed on the Subsea Testing Skid or may be disposed on or more separate skids that are provided for this purpose. Hydraulic hot stab connections between the testing skid and the fluid containment and supply skid or skids are provided to allow the fluid to flow through between the pumping skid and the fluid containment and supply skid or skids. The flow meter on the testing skid will display the volume pumped on the data logger display. A final sample of the power fluid is tested to ensure the required cleanliness standard. In one embodiment, the testing skid includes at least one electrical testing module that is adapted to check for continuity by measuring one or more of conductor resistance using a microhmmeter, insulation resistance using an insulation resistance tester, and time domain reflectometry (TDR) using a time domain reflectometer. In one embodiment of the invention an optical testing module is included for testing fiber-optic cables by optical time domain reflectometry (OTDR).

In one embodiment of the invention an optical testing module is included for testing fiber-optic cables by optical time domain reflectometry (OTDR).

In one embodiment, the skid will have hydraulic, electrical and fibre optic flying leads fitted with wet-mate connectors to make the connections between the testing skid and the subsea umbilical termination assembly (SUTA) fitted at either end of the static umbilical. In one embodiment of the invention, looping equipment is pre-installed to also allow testing on the SUTA at the opposite end of the static umbilical from where the skid is docked.

Data logger(s) are mounted on the skid to record the measurements taken via electrical and fiber optic flying leads connected to the logger. In one embodiment, at least one hydraulic flying lead connects to a hydraulic circuit on the skid. In one embodiment instrumentation, including flowmeters, pressure sensors, etc., are connected to the hydraulic circuit and a harness connects between the instrumentation and the data logger. Measurements can be displayed subsea and also relayed to the surface via the ROV, SV or AUV.

Example 2

In one embodiment of the invention, a subsea control system testing skid is adapted for testing of one or more of dynamic umbilicals, static umbilicals, flying leads, subsea control modules, production trees, test and intervention trees, manifolds and distribution units. In one aspect the skid is customized to the individual constituents and design parameters of the equipment to be tested. Testing may include one or more of electrical testing, optical testing, elemental analysis, and pressure testing. The subsea equipment are thus tested in their final position on the seabed (whilst waiting to be connected to the other parts of the subsea control system) by utilizing a testing skid mounted to and powered by a ROV, SV or AUV. ROV, SVs or AUVs are typically used to position control systems on the seabed. In one embodiment of the invention, testing skid utilizes the hydraulic power of an ROV, SV or AUV to carry out testing the control system component before connection to the remaining parts of the subsea control system.

In one embodiment the skid is adapted to carry out testing in accordance with the API 17E standard, which requires testing of electrical cables for conductor resistance, insulation resistance, high voltage & continuity by time domain reflectometry (TDR), testing of optical fiber using optical time domain reflectometry (OTDR), and hydraulic testing of fluid conduits such as hoses & tubes for proof pressure/decay, pressure integrity, flow & fluid cleanliness One embodiment of the present invention, the Subsea Testing Skid includes at least one pump that is operable to overcome the hydrostatic pressure of water up to and over 3,048 m (10,000 ft) deep. Hydrostatic pressure P (in pascals, Pa) is equal to $\rho g h$, where $\rho$ (rho) is the water density in kilograms per cubic meter, g is gravitational acceleration in meters per second squared, and h is the height of fluid above in meters. Although water density changes with temperature, for purposes of ready calculation, a $\rho$ value of 1027 kg/m$^3$ (density of seawater at 5° C.) will be used. Ignoring changes in gravitation as one departs from the earth's surface, a constant value for g of 9.8 m/s$^2$ can be used. Using these constants for $\rho$ and g, it can be calculated that the hydrostatic pressure of 304.8 m of water (1000 ft) is 3.07×10$^6$ Pa (P=1027×9.8×304.8), which converts to 445 p.s.i. (1 p.s.i.=6894.76 Pa). For 1000 m of water (3280 ft), the value is approximately 1460 p.s.i., while in 2743.2 m of water (9000 ft), the hydrostatic pressure is approximately 4,004 p.s.i. In 3048 m of water (10000 ft), the hydrostatic pressure is approximately 4,449 p.s.i. Thus, in the context of certain embodiments of the present invention, the pump is capable of providing pressure testing to 1.1×Design Working Pressure (DWP) in situations where ambient pressure at the suction may be in excess of 400 p.s.i. In certain embodiments, the high pressure pump will be able to deliver flow in situations where ambient pressure at the suction of the pump may be in excess of 4000 p.s.i. Typically, the system will be set up so that the fluid added to the umbilical to give the desired test pressure is drawn from a bladder that has been delivered to the subsea testing location. The bladder contents will be at ambient sea pressures. The discharge side of the pump that will deliver the test pressure is adapted to provide at least 3000 psi. In some embodiments the high pressure pump is operable to deliver as much as 20000 psi. High pressure pumps able to deliver such pressures are positive displacement pumps. In one aspect, the testing skid includes a high pressure positive displacement triplex pump operable to provide 20,000 psi of pressure.

The skid will include a filtration unit at the pump fluid intake to ensure that contaminants are not introduced into the control system conduits to be tested. Preferably, one or more filters at the pump inlet are able to filter out particles down to 50 micrometers ($\mu$ or microns) or lower in size. Additional pumps may be present on the skid to provide other services, such as for instance a backflush pump together with backflush pump filter to maintain the filters in a state of continued efficacy. The fluid conduits can also be flushed to achieve cleanliness levels to required standards.

In other embodiments, the skid includes a sample collection module. A sample solution is introduced into one or more fluid conduits in the control system and samples are taken at pre-determined intervals for evaluation using a pump, filtration unit and sampling bladder.

Figure 2:
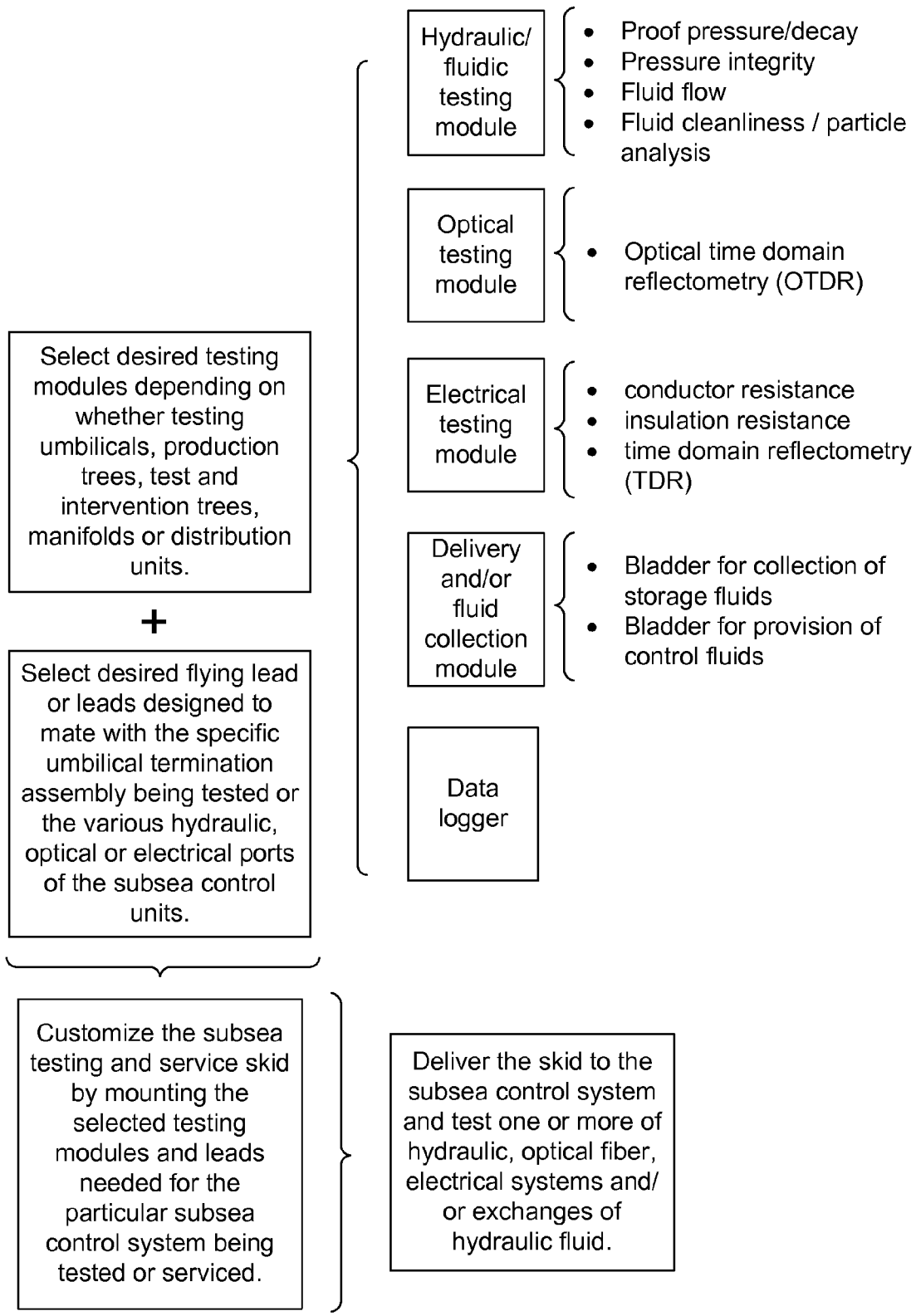
FIG. 2 depicts selection from a menu of testing modules in the design of a custom skid.

In one embodiment of the invention, the skid provides a physical framework facilitating the full range of subsea control system testing. To this end it is designed to carry several different pieces of equipment in module format, depending on the details of the job in hand. As depicted in FIG. 2, testing and service modules that may be utilized include fluidic, optical, and electrical testing modules, as well as elemental analysis modules and fluid collection and delivery modules. The modules and their included functionalities are selected depending on the testing or service project. In one embodiment as depicted in FIG. 2, the electrical testing module includes a microhmmeter for conductor resistance (CR) testing, an insulation resistance tester for insulation resistance (IR) testing, and a time domain reflectometer for time domain reflectometry (TDR) testing. In one embodiment as depicted, an optical testing module may be included for testing fiber-optic cables by optical time domain reflectometry (OTDR). The hydraulic testing module may include one or more of marinized equipment including for proof/pressure decay, pressure integrity, fluid flow and fluid cleanliness. After the desired components are selected and mounted on the skid, hydraulic, electrical and fibre optic flying testing leads fitted with wet-mate connectors are included that are customized to fit the particular subsea termination assembly of the control system equipment to be tested. Data logger(s) are mounted on the skid to record the measurements taken via the testing modules connected to the logger. The data loggers may be mounted in the same housing as the respective testing modules. The selected modules and their respective leads are mounted on the testing skid and delivered to the offshore location.

In one embodiment of a suitable testing skid, power is supplied hydraulically from an ROV or other source (AUV, SV). In one embodiment, the minimum power required by the skid from this source will be approximately 70 HP. Taking into account other power requirements in running the ROV, the total hydraulic power requirement to provide 70HP (52 kW) would be approximately 100HP (74 kW). More power may be required in certain applications. The testing skid is preferably provided with buoyancy, such as by one or more buoyancy compensator(s), in order that it can approximate neutral buoyancy at various depths. This facilitates maneuverability of the testing skid by the ROV, AUV or SV.

Example 3

Figure 3:
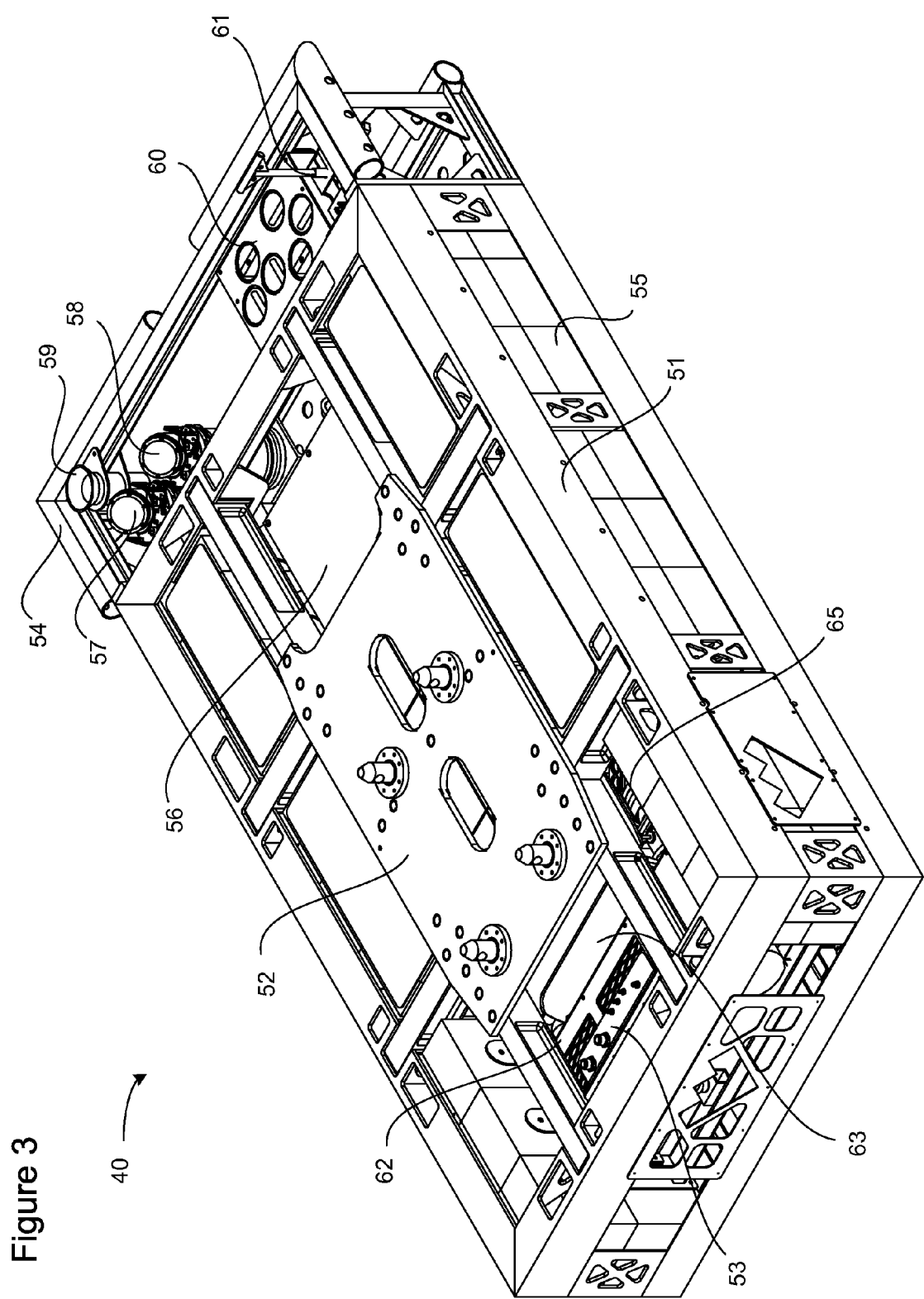
FIG. 3 depicts an embodiment of a testing skid having an ROV interface plate in place.

FIG. 3 depicts an embodiment of a testing skid (40) having a plurality of testing modules attached to and protected within frame (51). An optional protective bumper (54) may be affixed to all or only portions of frame (51). Buoyancy is provided to the skid by a plurality of fixed cell foam blocks (55). An ROV interface plate (52) is mounted to the top of frame (51). Hydraulic bulkhead (53) provides an interface for the ROV hydraulic pump, which provides power to the skid. In the depicted embodiment, a test fluid supply bladder is mounted within the frame and covered with a protective cage (56) to avoid inadvertent rupture. Mounted within the frame (51) are hydraulic testing data logger (57) and electrical and/or optical testing data logger (58). In other embodiments, each testing module, whether optical, electrical or hydraulic, shares a housing with its respective data logger and the testing modules (70), (72) and (74) as depicted in FIG. 4 but would not appear as depicted but would be disposed as depicted for data logger (58).

Figure 4:
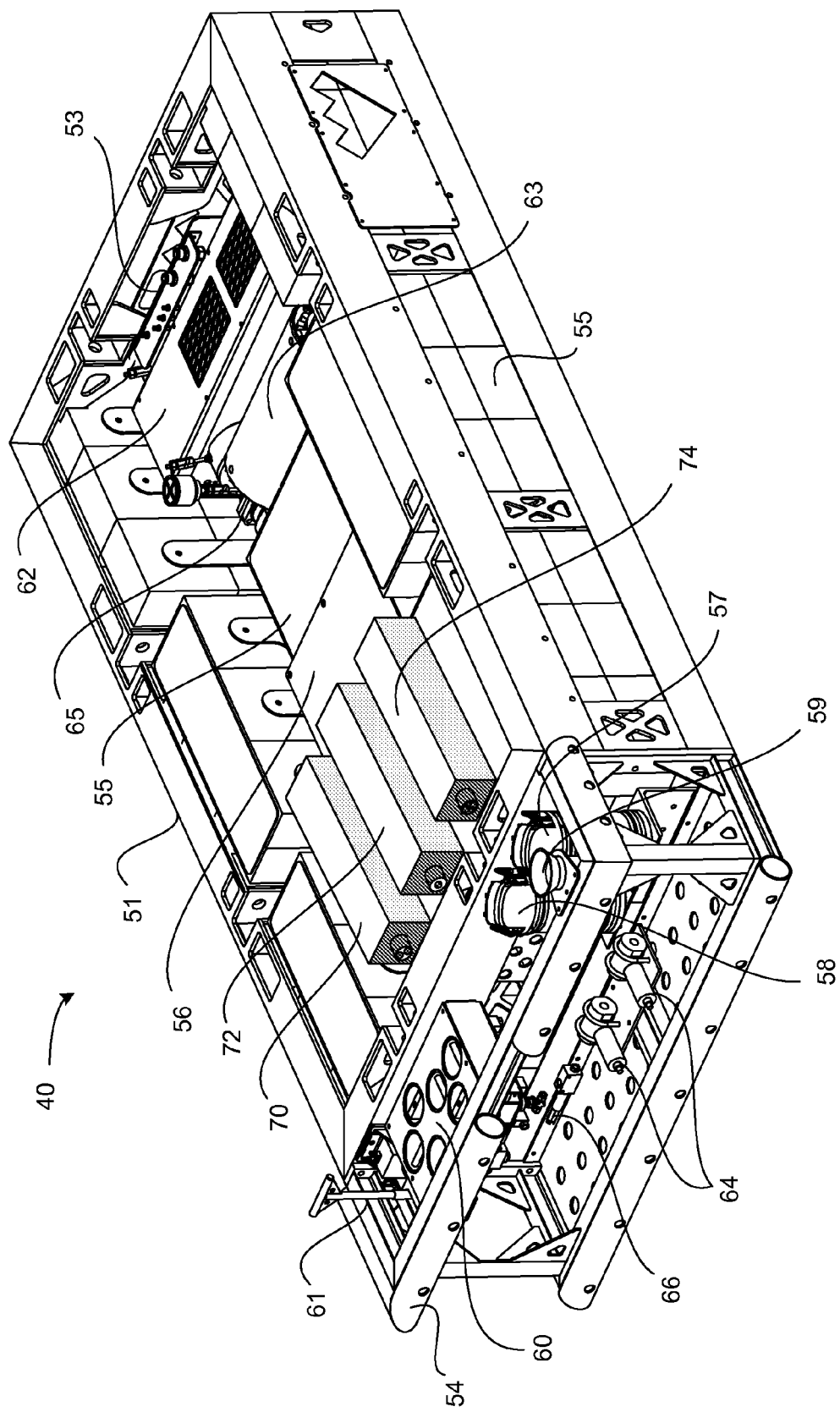
FIG. 4 depicts the embodiment of FIG. 3 with the ROV interface plate removed.

FIG. 4 depicts the skid (40) of FIG. 3 with the ROV interface plate removed. Further buoyancy blocks (55) in the center of the skid are visible in this view. Also visible is the filtered housing (62) overlying the high pressure pump and the full extent of the control fluid bladder and its protective cage (56) housing. Also depicted in the view of FIG. 4 are pressure relief valve (66) and flow meters (64). In the depicted embodiment, hydraulic/fluid testing module (70), optical testing module (72) and fluidic testing module (74) are mounted in the skid over the test fluid supply bladder and protective cage (56) although these modules could be placed elsewhere within in the skid. Each of the modules is in operable communication (not shown) with the hot stab and the data loggers. In other embodiments, the testing module, whether optical, electrical or hydraulic, shares a housing with its respective data logger and the testing modules (70), (72) and (74) would not appear as depicted but would be disposed as depicted for data logger (58). As depicted in FIG. 4, hot stab (59) provides an embodiment of a parking facility or hub for hydraulic, electrical or optical testing leads which connect the equipment to be tested. The hub is operably connected to one or more of hydraulic, electric and/or optical modules (70, 72 and 74) included on the skid.

Figure 5:
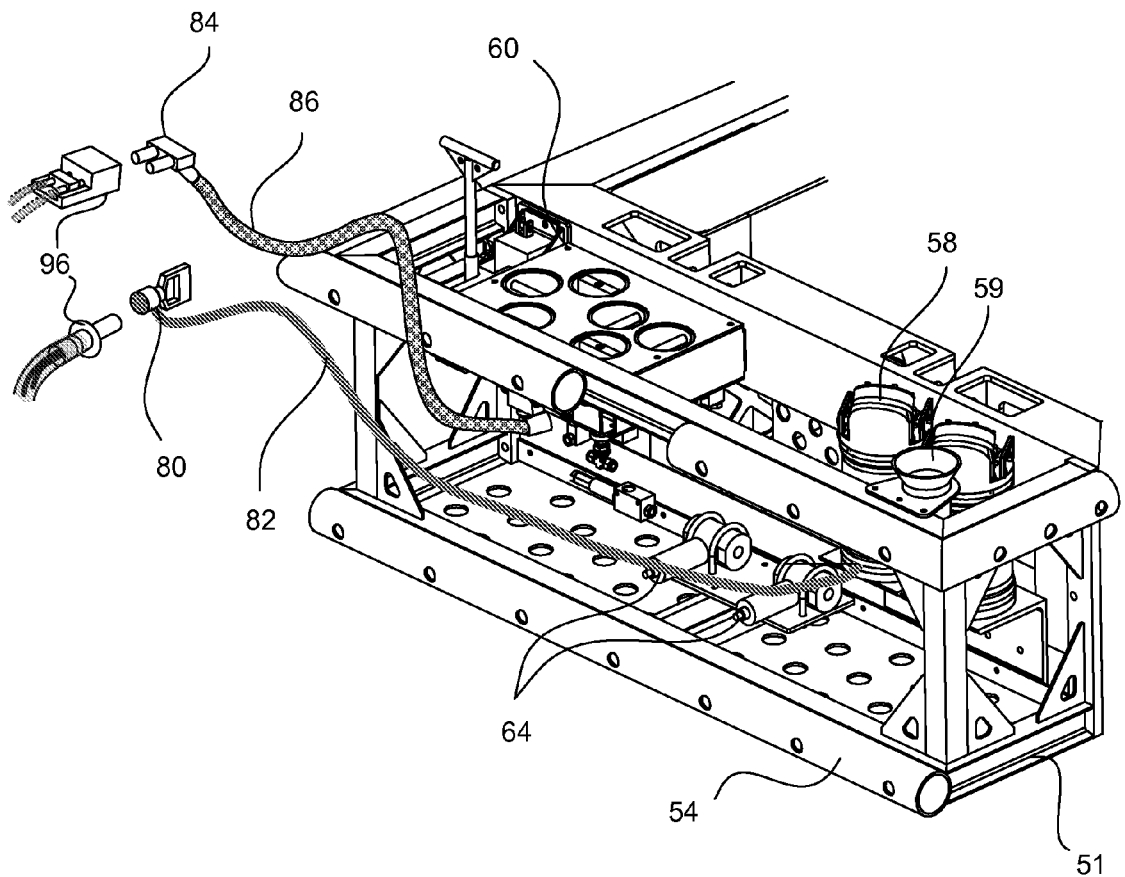
FIG. 5 depicts a close-up of the end of the skid of FIG. 4 that depicts the ROV operable panel and further depicts electrical and fluidic flying leads terminated with respective wet mate hot stabs.
Figure 7:
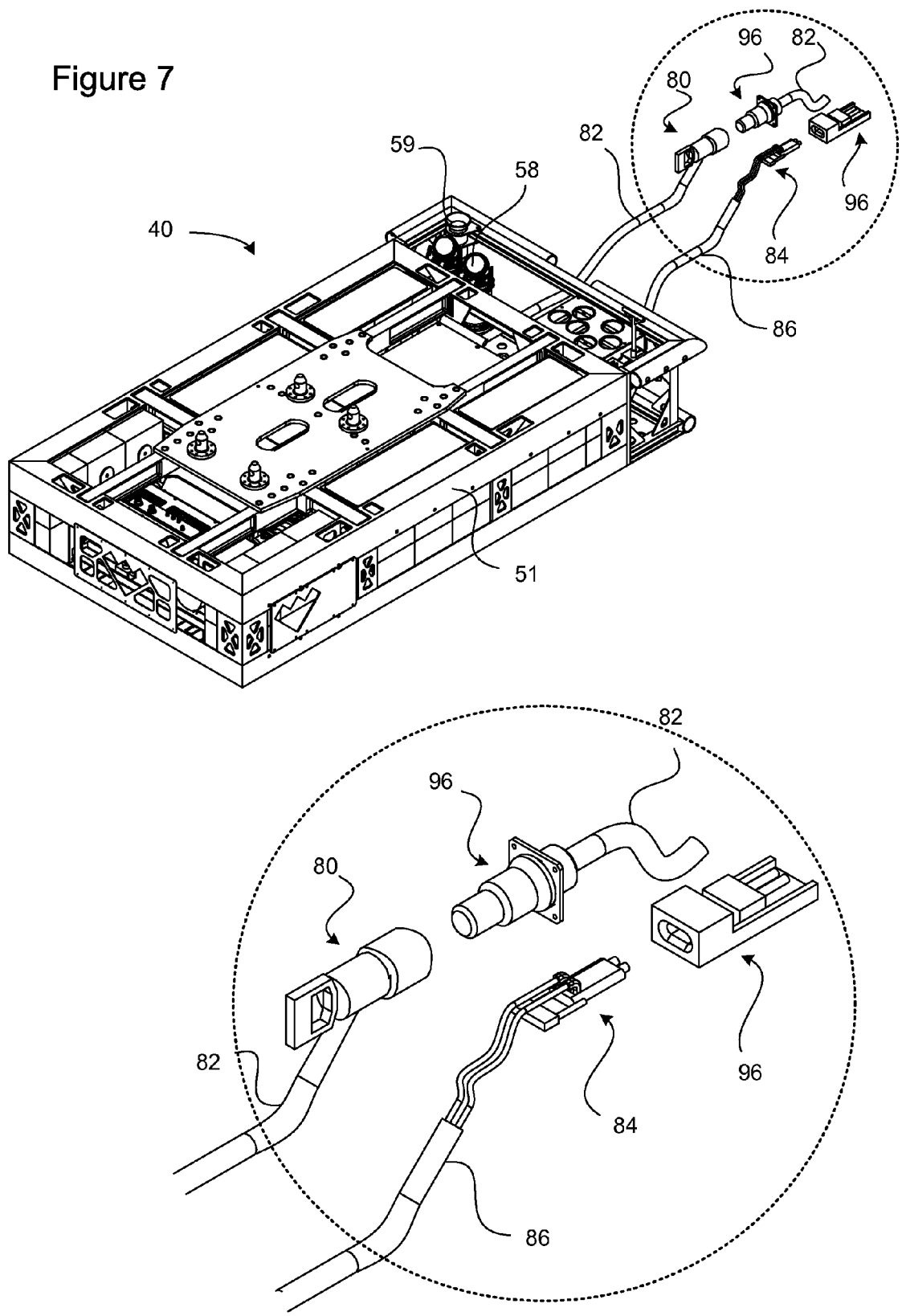
FIG. 7 depicts an embodiment of a testing skid from the perspective view of FIG. 3, but including flying leads and electrical and fluidic terminals.

In alternative embodiments such as that depicted in FIG. 5, which shows one end only of a testing skid, one or more flying leads, such as electrical flying lead (82) and fluidic flying lead (86), extend from the skid in lieu of, or in addition to, hot stab (59). In the depicted example, fluidic flying lead (86) is connected to the skid in operable connection with certain fluidic conduits and valves of the skid, such as those under the ROV operable panel including double block and bleed (60). The electrical flying lead (82) is connected to, or otherwise in, electrical communication with the electrical testing data logger. An optical testing flying lead, if included, would, in certain embodiments, be connected to its data logger and extend from the skid generally as does electrical flying lead (82). Fluidic (or hydraulic) hot stab (84) is attached to the terminus of fluidic flying lead (86), while electrical (or optical) hot stab (80) is attached to the terminus of electrical (or optical) flying lead (82). In most cases the hot stabs include zero leak type wet mate connectors that prevent water ingress during connection. The hot stabs can be male or female stabs but are in any event customized to mate with fluidic, electrical or optical terminus (96) of aspects of the control system to be tested. The termini of the flying leads are shown from a different perspective in FIG. 7.

Figure 6:
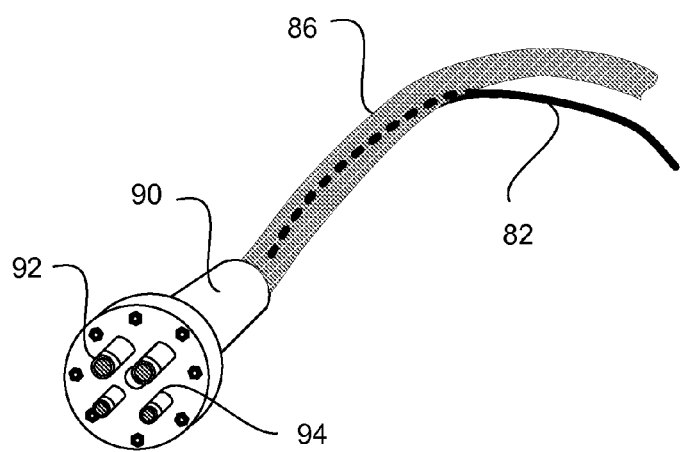
FIG. 6 depicts a reciprocal hot stab head according to one embodiment.

Typically the electrical flying lead will have a harness that is attached to, and obtains test power from, the ROV. In some aspects, the ROV is connected by a tether to the surface and information and power is relayed between the surface and the skid through the ROV. In one embodiment, a plurality of hot stabs is provided, one hot stab for each of a plurality of different testing modules disposed on the testing skid. In other embodiments, a reciprocal hot stab head (90), such as that figuratively depicted in FIG. 6, is used to connect the testing skid to a subsea control module or umbilical. As used herein, a reciprocal hot stab head, is a custom head that is a matching reciprocal of the connection end of an umbilical or connection port of a subsea control module. As depicted, the reciprocal head may terminate in one or more couplings, such as fluidic couplings (92) and electrical couplings (94). In one embodiment, flying leads are bundled at the reciprocal hot stab head but separate for connections to the skid.

In one aspect, the hot stabs are color coded for ready identification by the ROV operator. ROV operable panel (60) includes double block and bleed valves and provides easily grasped valve and switch handles. The skid includes high pressure pump disposed beneath filtered housing (62). A filter or filter bank (63) is disposed in-line between the control fluid supply bladder (56) and the high pressure pump to ensure cleanliness of the supplied hydraulic fluid. Hydraulic motor (65) operates the high pressure pump. A ROV hand operated pump (61) is included to equalize the pressure between the skid mounted pump and fluidic conduits of the subsea control system before valves separating the two are opened. The hand pump is operated by manual strokes from an arm of the ROV.

All publications, patents and patent applications cited herein are hereby incorporated by reference as if set forth in their entirety herein. While this invention has been described with reference to illustrative embodiments, this description is not intended to be construed in a limiting sense. Various modifications and combinations of illustrative embodiments, as well as other embodiments of the invention, will be apparent to persons skilled in the art upon reference to the description. It is therefore intended that the appended claims encompass such modifications and enhancements.

The invention claimed is:

1. A subsea control system testing skid comprising:
   at least one fluidic conduit testing module and at least one additional marinized testing module, the additional marinized testing module selected from one or more of an electrical testing module and an optical testing module, wherein each of the testing modules are operably mounted on the skid for and during the testing of components present on a subsea control system;
   at least one data logger mounted on the skid and in electrical communication with the testing modules and configured to record the measurements taken via the testing modules; and
   at least one flying lead or hot stab connectable between the testing modules and a termination assembly on the subsea control system.

2. The skid of claim 1, wherein the termination assembly is a subsea umbilical termination assembly.

3. The skid of claim 1, wherein the skid further comprises a high pressure positive displacement pump in fluidic communication with a test fluid supply, and a test fluid filtration system in fluid communication with, and disposed between, the high pressure pump and the test fluid supply whereby the test fluid is filtered prior to entry into the pump.

4. The skid of claim 3, wherein the test fluid filtration system is mounted on the skid.

5. The skid of claim 3, wherein the test fluid supply is a test fluid supply bladder mounted on a separate skid.

6. The skid of claim 3, further comprising a fluidic connection for communication to a waste fluid containment bladder.

7. The skid of claim 3, wherein the pump is a high pressure positive displacement triplex pump operable to deliver pressure up to 20,000 p.s.i.

8. The skid of claim 1, wherein the skid comprises an electrical testing module including one or more of a microhmmeter, an insulation resistance tester, and a time domain reflectometry (TDR) tester.

9. The skid of claim 1, wherein the skid comprises an optical testing module that includes an optical time domain reflectometer.

10. The skid of claim 1, wherein the at least one flying lead is fitted with a wet-mate connector to make connections between the testing skid and the termination assembly on the subsea control system.

11. A method of testing and service of a subsea control system comprising:
transporting a testing and service skid to a subsea control system using a SV, ROV or AUV, wherein the testing and service skid comprises a plurality of testing or service modules operably mounted on the skid together with one or more respective testing or service data loggers operably mounted on the skid and wherein the plurality of testing or service modules include at least one fluidic conduit testing module and at least one additional marinized testing module, the additional marinized testing module selected from one or more of an electrical testing module and an optical testing module, each of the modules configured to test components present on a subsea control system;
docking the testing and service skid to a termination assembly on the subsea control system;
utilizing one or more of the testing or service modules mounted on the skid to perform one or more of electrical, optical and fluidic conduit testing on the subsea control system while the testing modules are mounted on the testing skid, and
logging the conduct of the electrical, optical and/or fluidic conduit testing on the one or more subsea data logger(s).

12. The method of claim 11 wherein the subsea control system is selected from a dynamic umbilical, static umbilical, flying lead, and a subsea control module in operable association with one or more production trees, manifolds and distribution units.

13. The method of claim 11, wherein the testing and service skid comprises a fluidic testing module and the method further comprises utilizing the fluidic conduit testing module to control a high pressure test that is performed on one or more fluidic conduits of the subsea control system using a high pressure positive displacement pump mounted on the skid.

14. The method of claim 13, further comprising supplying a test fluid from test fluid supply bladder for the high pressure test.

15. The method of claim 14, further comprising filtering the test fluid through a test fluid filtration system in fluid communication with, and disposed between, the high pressure pump and the test fluid supply prior to entry into the high pressure pump during the high pressure test.

16. The method of claim 13, wherein the high pressure test is conducted to a pressure of 1.1×DWP (design working pressure) of the fluidic conduit being tested.

17. A subsea control system testing skid comprising:
a subsea testing skid frame having a ROV, SUV or AUV interface plate;
a plurality of marinized testing modules mounted on the subsea testing skid including at least one marinized fluidic testing module and at least one additional marinized testing module, the additional marinized testing module selected from one or more of an electrical and an optical testing module, wherein the testing modules are configured to test components present on a subsea control system while the testing modules are mounted on the testing skid;
at least one data logger mounted on the skid in operable communication with each of the plurality of marinized testing modules and configured to record measurements taken subsea via the testing modules; and
at least one flying lead or hot stab mounted on the skid and connectable between the testing modules and a termination assembly on the subsea control system.

18. The subsea control system testing skid of claim 17, further comprising a high pressure positive displacement pump in fluid communication with the fluidic testing module.

19. The subsea control system testing skid of claim 17, further comprising a test fluid supply conduit in fluid communication with the high pressure pump.

20. The subsea control system testing skid of claim 19, further comprising a test fluid filtration system in fluid communication with the high pressure pump and disposed between the high pressure pump and a test fluid supply.

21. The subsea control system testing skid of claim 17, wherein the high pressure pump is a high pressure positive displacement triplex pump operable to deliver pressure up to 20,000 p.s.i.

* * * * *

UNITED STATES PATENT AND TRADEMARK OFFICE
CERTIFICATE OF CORRECTION

| | | |
|---|---|---|
| PATENT NO. | : 8,430,168 B2 | Page 1 of 1 |
| APPLICATION NO. | : 12/468158 | |
| DATED | : April 30, 2013 | |
| INVENTOR(S) | : Goodall et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 630 days.

Signed and Sealed this
Eleventh Day of November, 2014

Michelle K. Lee
*Deputy Director of the United States Patent and Trademark Office*